(12) United States Patent
Caveney et al.

(10) Patent No.: US 8,128,428 B2
(45) Date of Patent: Mar. 6, 2012

(54) CROSS CONNECT PATCH GUIDANCE SYSTEM

(75) Inventors: Jack E. Caveney, North Palm Beach, FL (US); Ronald A. Nordin, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/708,223

(22) Filed: Feb. 18, 2010

(65) Prior Publication Data

US 2010/0210134 A1  Aug. 19, 2010

Related U.S. Application Data

(60) Provisional application No. 61/153,876, filed on Feb. 19, 2009.

(51) Int. Cl.
*H01R 3/00* (2006.01)
(52) U.S. Cl. ........................................................ 439/490
(58) Field of Classification Search .......... 439/488–490, 439/404, 515; 340/815, 45, 657, 12.32, 568.2; 702/127; 324/66, 133, 508; 327/518; 362/253
See application file for complete search history.

(56) References Cited

U.S. PATENT DOCUMENTS

| | | |
|---|---|---|
| 3,052,842 A | 9/1962 | Frohman et al. |
| 3,573,789 A | 4/1971 | Sharp et al. |
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |
| 4,169,220 A | 9/1979 | Fields |
| 4,196,316 A | 4/1980 | McEowen et al. |
| 4,517,619 A | 5/1985 | Uekubo |
| 4,673,246 A | 6/1987 | Schembri |
| 4,773,867 A | 9/1988 | Keller et al. |
| 4,796,294 A | 1/1989 | Nakagawara |
| 4,869,566 A | 9/1989 | Juso et al. |

(Continued)

FOREIGN PATENT DOCUMENTS

EP    0297079 B1    3/1992

(Continued)

OTHER PUBLICATIONS

"Finding the Missing Link," Cabling Installation & Maintenance, Jun./Jul. 2002.

(Continued)

*Primary Examiner* — Alexander Gilman
(74) *Attorney, Agent, or Firm* — Robert A. McCann; Zachary J. Smolinski; Christopher S. Clancy

(57) ABSTRACT

An intelligent network patch field management system and specialized cross-connect cable are provided to help guide, monitor, and report on the process of connecting and disconnecting patch cords plugs in a cross-connect patching environment. The system is also capable of monitoring patch cord connections to detect insertions or removals of patch cords or plugs. The cross-connect cable is provided with LED's in both of the cable plugs. When only one plug of the cross-connect cable is plugged into a port, the LED associated with that plug is switched out of the circuit, while the LED in the unplugged plug remains in the circuit and can still be illuminated by the system.

2 Claims, 4 Drawing Sheets

U.S. PATENT DOCUMENTS

| | | | |
|---|---|---|---|
| 4,890,102 A | 12/1989 | Oliver | |
| 4,901,004 A | 2/1990 | King | |
| 4,937,529 A | 6/1990 | O'Toole, III et al. | |
| 4,937,835 A | 6/1990 | Omura | |
| 5,037,167 A | 8/1991 | Beaty | |
| 5,081,627 A | 1/1992 | Yu | |
| 5,107,532 A | 4/1992 | Hansen et al. | |
| 5,111,408 A | 5/1992 | Amjadi | |
| 5,145,380 A | 9/1992 | Holcomb et al. | |
| 5,161,988 A | 11/1992 | Krupka | |
| 5,170,327 A | 12/1992 | Burroughs | |
| 5,204,929 A | 4/1993 | Machall et al. | |
| 5,222,164 A | 6/1993 | Bass, Sr. et al. | |
| 5,226,120 A | 7/1993 | Brown et al. | |
| 5,233,501 A | 8/1993 | Allen et al. | |
| 5,265,187 A | 11/1993 | Morin et al. | |
| 5,270,658 A | 12/1993 | Esptein | |
| 5,305,405 A | 4/1994 | Emmons et al. | |
| 5,353,367 A | 10/1994 | Czosnowski et al. | |
| 5,375,028 A | 12/1994 | Fukunaga | |
| 5,394,503 A | 2/1995 | Dietz, Jr. et al. | |
| 5,432,847 A | 7/1995 | Hill et al. | |
| 5,459,478 A | 10/1995 | Bolger et al. | |
| 5,463,706 A | 10/1995 | Dumont et al. | |
| 5,483,467 A | 1/1996 | Krupka et al. | |
| 5,487,666 A | 1/1996 | DiGiovanni | |
| 5,521,902 A | 5/1996 | Ferguson | |
| 5,532,603 A | 7/1996 | Bottman | |
| 5,546,282 A | 8/1996 | Hill et al. | |
| 5,550,755 A | 8/1996 | Martin et al. | |
| 5,583,874 A | 12/1996 | Smith et al. | |
| 5,666,453 A | 9/1997 | Dannenmann | |
| 5,684,796 A | 11/1997 | Abidi et al. | |
| 5,726,972 A | 3/1998 | Ferguson | |
| 5,727,055 A | 3/1998 | Ivie et al. | |
| 5,754,112 A | 5/1998 | Novak | |
| 5,764,043 A | 6/1998 | Czosnowski et al. | |
| 5,790,041 A | 8/1998 | Lee | |
| 5,832,071 A | 11/1998 | Voelker | |
| 5,847,557 A | 12/1998 | Fincher et al. | |
| 5,854,824 A | 12/1998 | Bengal et al. | |
| 5,870,626 A | 2/1999 | Lebeau | |
| 5,876,240 A | 3/1999 | Derstine et al. | |
| 5,878,030 A | 3/1999 | Norris | |
| 5,892,756 A | 4/1999 | Murphy | |
| 5,898,837 A | 4/1999 | Guttman et al. | |
| 5,915,993 A | 6/1999 | Belopolsky et al. | |
| 5,923,663 A | 7/1999 | Bontemps et al. | |
| 5,944,535 A | 8/1999 | Bullivant et al. | |
| 6,002,331 A | 12/1999 | Laor | |
| 6,041,352 A | 3/2000 | Burdick et al. | |
| 6,067,014 A | 5/2000 | Wilson | |
| 6,078,113 A | 6/2000 | True et al. | |
| 6,086,415 A | 7/2000 | Sanchez et al. | |
| 6,094,261 A | 7/2000 | Contarino, Jr. | |
| 6,168,555 B1 | 1/2001 | Fetterleigh et al. | |
| 6,175,865 B1 | 1/2001 | Dove et al. | |
| 6,222,908 B1 | 4/2001 | Bartolutti et al. | |
| 6,229,538 B1 | 5/2001 | McIntyre et al. | |
| 6,234,830 B1 | 5/2001 | Ensz et al. | |
| 6,243,510 B1 | 6/2001 | Rauch | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,381,283 B1 | 4/2002 | Bhardwaj et al. | |
| 6,421,322 B1 | 7/2002 | Koziy et al. | |
| 6,424,710 B1 | 7/2002 | Bartolutti et al. | |
| 6,434,716 B1 | 8/2002 | Johnson et al. | |
| 6,437,894 B1 | 8/2002 | Gilbert et al. | |
| 6,453,014 B1 | 9/2002 | Jacobson et al. | |
| 6,456,768 B1 | 9/2002 | Boncek et al. | |
| 6,499,861 B1 | 12/2002 | German et al. | |
| 6,522,737 B1 | 2/2003 | Bartolutti et al. | |
| 6,543,941 B1 | 4/2003 | Lampert | |
| 6,561,827 B2 | 5/2003 | Frostrom et al. | |
| 6,574,586 B1 | 6/2003 | David et al. | |
| 6,577,243 B1 | 6/2003 | Dannenmann et al. | |
| 6,588,938 B1 | 7/2003 | Lampert et al. | |
| 6,601,097 B1 | 7/2003 | Cheston et al. | |
| 6,626,697 B1 | 9/2003 | Martin et al. | |
| 6,629,269 B1 | 9/2003 | Kahkoska | |
| 6,684,179 B1 | 1/2004 | David | |
| 6,688,910 B1 | 2/2004 | Macauley | |
| 6,714,698 B2 | 3/2004 | Pfeiffer et al. | |
| 6,725,177 B2 * | 4/2004 | David et al. | 702/183 |
| 6,750,643 B2 | 6/2004 | Hwang et al. | |
| 6,778,911 B2 | 8/2004 | Opsal et al. | |
| 6,784,802 B1 | 8/2004 | Stanescu | |
| 6,798,944 B2 | 9/2004 | Pfeiffer et al. | |
| 6,802,735 B2 | 10/2004 | Pepe et al. | |
| 6,823,063 B2 | 11/2004 | Mendoza | |
| 6,857,897 B2 | 2/2005 | Conn | |
| 6,871,156 B2 | 3/2005 | Wallace et al. | |
| 6,894,480 B2 | 5/2005 | Back | |
| 6,898,368 B2 | 5/2005 | Colombo et al. | |
| 6,905,363 B2 | 6/2005 | Musolf et al. | |
| 6,906,505 B2 | 6/2005 | Brunet et al. | |
| 6,975,242 B2 | 12/2005 | Dannenmann et al. | |
| 6,992,491 B1 | 1/2006 | Lo et al. | |
| 7,005,861 B1 | 2/2006 | Lo et al. | |
| 7,027,704 B2 | 4/2006 | Frohlich et al. | |
| 7,028,087 B2 | 4/2006 | Caveney | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,068,043 B1 | 6/2006 | Lo et al. | |
| 7,068,044 B1 | 6/2006 | Lo et al. | |
| 7,160,143 B2 | 1/2007 | David et al. | |
| 7,207,846 B2 | 4/2007 | Caveney et al. | |
| 7,234,944 B2 | 6/2007 | Nordin et al. | |
| 2002/0069277 A1 | 6/2002 | Caveney | |
| 2002/0071394 A1 | 6/2002 | Koziy et al. | |
| 2002/0090858 A1 * | 7/2002 | Caveney | 439/490 |
| 2002/0116485 A1 | 8/2002 | Black et al. | |
| 2003/0061393 A1 | 3/2003 | Steegmans et al. | |
| 2003/0073343 A1 | 4/2003 | Belesimo | |
| 2003/0152087 A1 | 8/2003 | Shahoumian et al. | |
| 2004/0044599 A1 | 3/2004 | Kepner et al. | |
| 2004/0052471 A1 | 3/2004 | Colombo et al. | |
| 2004/0065470 A1 | 4/2004 | Goodison et al. | |
| 2004/0073597 A1 | 4/2004 | Caveney et al. | |
| 2004/0077220 A1 | 4/2004 | Musolf et al. | |
| 2004/0219827 A1 | 11/2004 | David et al. | |
| 2005/0052174 A1 | 3/2005 | Angelo et al. | |
| 2005/0111491 A1 | 5/2005 | Caveney | |
| 2005/0136729 A1 | 6/2005 | Redfield et al. | |
| 2005/0141431 A1 | 6/2005 | Caveney et al. | |
| 2005/0186819 A1 | 8/2005 | Velleca et al. | |
| 2005/0195584 A1 | 9/2005 | AbuGhazaleh et al. | |
| 2005/0224585 A1 | 10/2005 | Durrant et al. | |
| 2005/0231325 A1 | 10/2005 | Durrant et al. | |
| 2005/0239339 A1 | 10/2005 | Pepe | |
| 2005/0245127 A1 | 11/2005 | Nordin et al. | |
| 2006/0047800 A1 | 3/2006 | Caveney et al. | |
| 2006/0057876 A1 | 3/2006 | Dannenmann et al. | |
| 2006/0282529 A1 | 12/2006 | Nordin et al. | |
| 2007/0032124 A1 | 2/2007 | Nordin et al. | |
| 2007/0032134 A1 * | 2/2007 | Takano et al. | 439/607 |
| 2007/0117444 A1 * | 5/2007 | Caveney et al. | 439/404 |
| 2007/0132503 A1 * | 6/2007 | Nordin | 327/518 |
| 2008/0122579 A1 | 5/2008 | German et al. | |

FOREIGN PATENT DOCUMENTS

| | | |
|---|---|---|
| EP | 0575100 B1 | 12/1993 |
| EP | 0745229 B1 | 3/2003 |
| EP | 178825 A2 | 5/2007 |
| FR | 2680067 A1 | 2/1993 |
| GB | 2236398 A | 4/1991 |
| GB | 2347751 A | 9/2000 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |

| | | |
|---|---|---|
| WO | 2004044599 A2 | 3/2004 |
| WO | 2005072156 A2 | 8/2005 |
| WO | 2006052686 A1 | 5/2006 |

OTHER PUBLICATIONS

"IntelliMAC—The New Intelligent Cable Management Solution by ITRACS & NORDX/CDT," Press Release 2003.
"RiT Technologies Ltd. SMART Cabling System," RiT Technologies Ltd., 2004.
"Ortronics Launches iTRACS—Ready Structured Cabling Solutions," News Release Mar. 7, 2003.
"The SYSTIMAX iPatch System—Intelligent yet simple patching . . . ", CommScope, Inc., 2004.
"White Paper—intelligent Patching." David Wilson, Nov. 2002.
"PatchView for the Enterprise (PV4E) technical backround/Networks for Business," Jun. 24-26, 2003.
"RiT Technologies Ltd. Go Patch-less," May 2000 Edition of Cabling Systems.
"Intelligent Cable Management Systems—Hot Topics", Trescray.
"Brand-Rex Network solutions Access racks Cat 5E6 cabling UK".
"Molex Premise Networks/Western Europe-Real Time Patching System" Molex Prem. Networks, 2001.
"Product of the Week—Molex's Real Time Patching System".
"EC&M Taking Note of Patch Panel Technology," Mark McElroy, Jun. 1, 1998.
"Intellegent Patching SMART Patch for the Enterprise (SP4E)".

* cited by examiner

CROSS CONNECT PATCH GUIDANCE SYSTEM

PRIORITY CLAIM

The present application claims the benefit of U.S. Provisional Application Ser. No. 61/153,876, entitled "Cross Connect Patch Guidance System" and filed Feb. 19, 2009.

TECHNICAL FIELD

The present application relates to network documentation and revision systems, and more particularly to a system for implementing intelligent cross-connect patching and guidance.

BACKGROUND

Communications networks are growing in number and complexity, and are continually being interconnected to satisfy customers' needs. Patch panels are used in communications networks as intermediate elements between endpoint devices (such as computers and telephones) and upstream devices such as network switches. In a LAN, for example, the patch panel connects the network's computers to switches or routers that enable the LAN to connect to the Internet or another wide area network (WAN). Connections are made with patch cords. The patch panel allows connections to be arranged and rearranged by plugging and unplugging the patch cords.

When physical connections between endpoint devices and network switches are added, moved, or removed, patch panels are the points at which technicians complete the required installations or removals of patch cords within patch fields. Patch panels offer the convenience of allowing technicians to quickly change the paths of selected signals.

Patch panels are typically deployed in one of two configurations: cross-connect, and interconnect. In a cross-connect configuration, two patch panels are disposed between end user devices and a network switch, and in an interconnect configuration, only one patch panel is disposed between the end-user devices and a network switch.

Human error associated with the implementation and maintenance of physical cable connections between pieces of network communication equipment can result in significant negative impact to a network. Such negative impact can be avoided through improved control and verification of network cable installation and removal work orders implemented by network technicians. It is also desirable to provide an easy-to-understand indication system for technicians to follow when performing moves, adds, and changes (MAC's) to patch cords and connections in a patch field, including visual guidance of steps to follow during a MAC procedure.

SUMMARY

In some embodiments of the present invention, systems for guiding patch cord installations and removals in a cross-connect deployment are provided. Patch cords are provided with circuitry and lights, such as light-emitting diodes (LED's), within patch cord plugs, to allow for the provision of easily followed instructions to a technician performing patch cord MAC's in a cross-connect patch field.

Systems according to the present invention make use of patch cords having conductors and contacts that are provided for the purpose of patch cord management. Patch cords according to embodiments of the present are "ten-wire" patch cords. This term is used in connection with a traditional "eight-wire" copper Ethernet patch cord, comprising four conductive pairs. A "ten-wire" patch cord according to the present invention has two extra conductors dedicated to patch cord management, which may be termed "patch cord management conductors." While the terms "ten-wire" and "ninth" and "tenth" conductors will be used to describe the present invention, it is to be understood that the principles of this invention can be extended to copper patch cords having more or fewer than eight conductors, and also to optical patch cords and copper-fiber hybrid patch cords.

These and other aspects of the present invention are explained to those of ordinary skill in the art in the following detailed description, with reference to the drawings. It should be understood that the embodiments noted herein are not intended to limit the scope of the invention.

DETAILED DESCRIPTION

Figure 1:
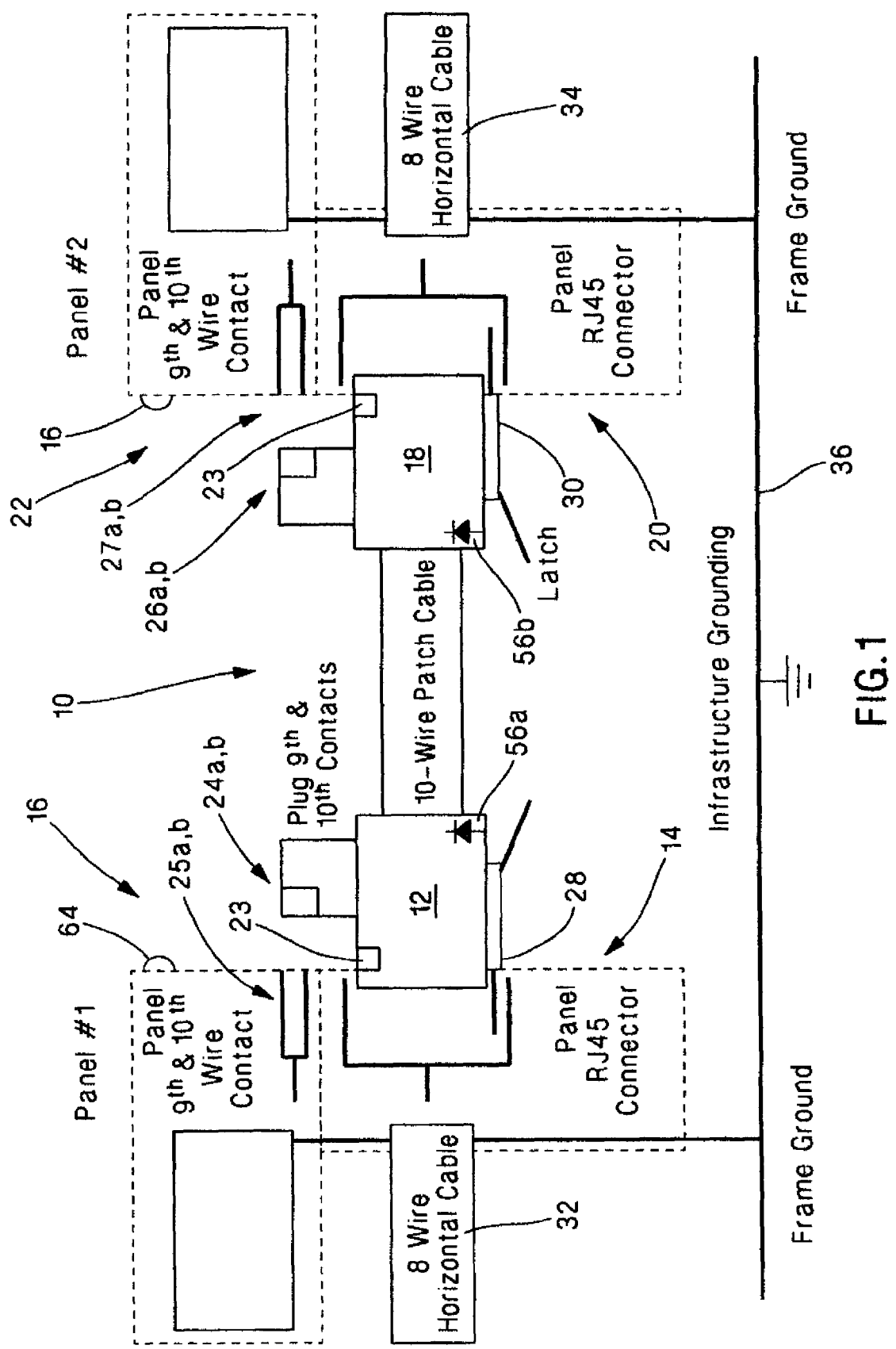
FIG. 1 illustrates patch panel ports of intelligent patch panels in a cross-connect deployment connected by a ten-wire patch cord for use with one embodiment of the present invention.

FIG. 1 shows a ten-wire cross-connect patch cord 10 for use with one embodiment of the present invention. The ten-wire cross-connect patch cord 10 has a first plug 12, adapted for insertion into a port 14 of a first intelligent patch panel 16; and a second plug 18, adapted for insertion into a port 20 of a second intelligent patch panel 22. While the first plug 12 and the second plug 18 are specially designed for use with the present invention, in one embodiment these plugs are designed to be capable of insertion into any RJ-45 jack. While only one port is shown per patch panel, it is to be understood that patch panels according to the present invention are preferably provided with many ports. For example, in one embodiment 24 ports may be provided on each patch panel.

In addition to standard communication contacts 23, the first plug 12 has ninth and tenth contacts 24a and 24b adapted to make contact with ninth and tenth panel contacts 25a and 25b provided at the port 14 of the first intelligent patch panel 16. The second plug 18 is also provided with ninth and tenth contacts 26a and 26b adapted to make contact with ninth and tenth panel contacts 27a and 27b provided at the port 20 of the second intelligent patch panel 22. Each of the first and second plugs 12 and 18 is provided with a switch mechanism, respectively 28 and 30, that allows a determination of whether or not the plug is inserted into a port of an intelligent patch panel, as explained in further detail below.

As shown in FIG. 1, the ports 14 and 20 are connected to respective horizontal communication cables 32 and 34. The intelligent patch panels 16 and 22 are connected to frame and infrastructure grounding 36.

Figure 2:
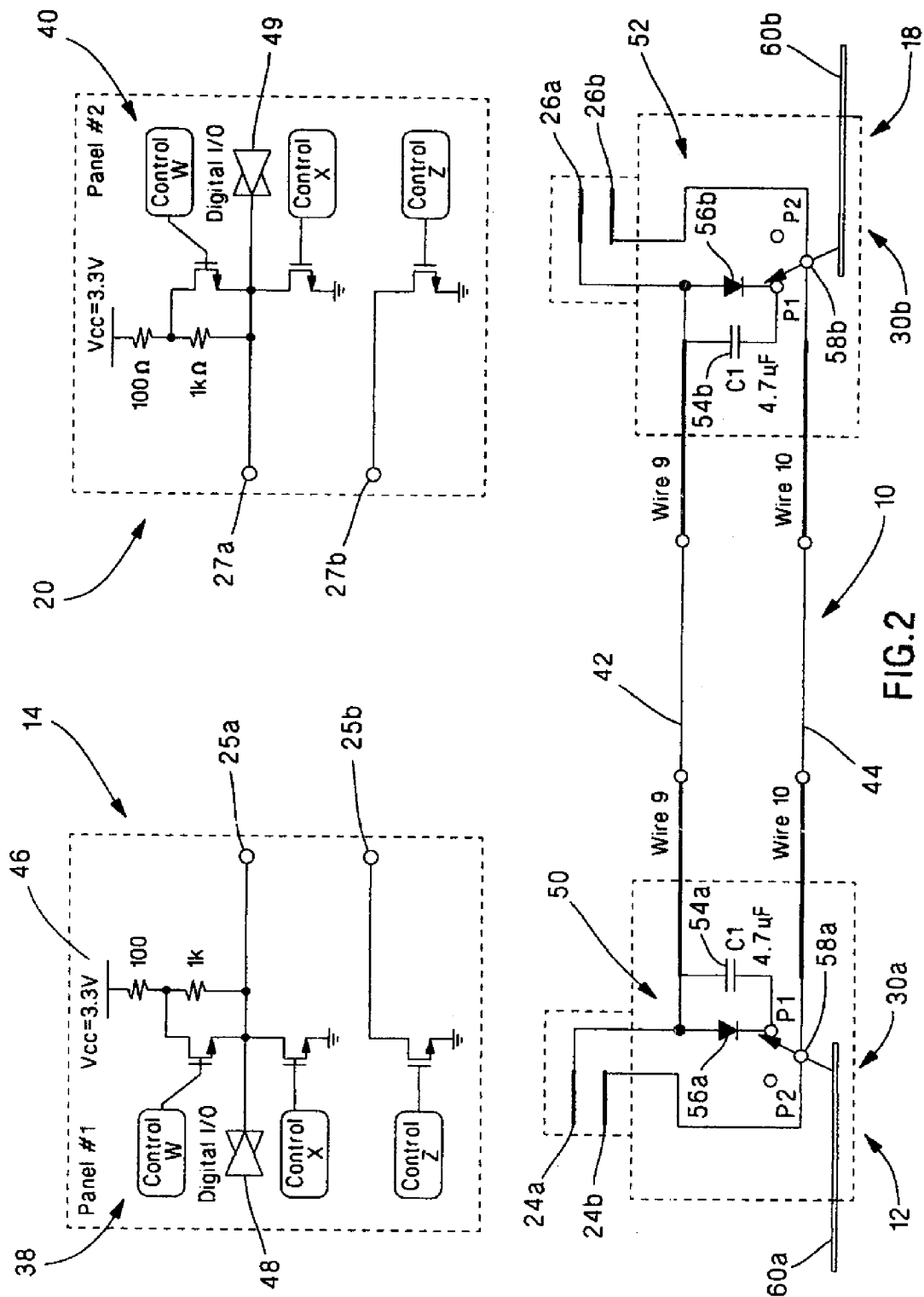
FIG. 2 is a schematic diagram of circuitry within intelligent patch panels in a cross-connect configuration and a ten-wire patch cord.

As shown in FIG. 2, the intelligent patch panels 16 and 22 are provided with control and detection circuits 38 and 40. The control and detection circuits 38 and 40 are capable of controlling a voltage placed on ninth and tenth wires and detecting patch cord plug insertion or removal states based on resulting electrical states. Each control and detection circuit is provided with a voltage input 46 and a plurality of controls w, x, and z. Digital input/output gates 48 and 49 are also provided, and allow for digital communications between the patch panels as well as the generation and routing of connection management signals within a patch panel (which may, in turn, be connected to a network management system).

Each of the first and second plugs 12 and 18 is provided with plug circuitry 50 and 52, respectively. The plug circuitry of each plug comprises a capacitor 54a,b; a light emitting diode 56a,b; and a switch 58a,b that is actuated by a plunger 60a,b in a switch mechanism 30a,b. According to one embodiment, the capacitors 54a,b are identical and have a capacitance of 4.7 µF.

In FIG. 2, the patch cord 10 is not plugged into either intelligent patch panel port, and thus no electrical connection exists between the ninth and tenth panel contacts of the panels (25a,b and 27a,b) and the ninth and tenth contacts of the patch cord 10 (24a,b and 26a,b). The intelligent patch panel ports 14 and 20 are in a "ready" state, and they are prepared to detect insertion of either plug 12 or 18 into either patch panel port 14 or 20. In the embodiment shown in FIG. 2, the control and detection circuit 38 of the first intelligent patch panel port 14 is identical to the control and detection circuit 40 of the second intelligent patch panel port 20, and the plug circuitry 50 of the first plug 12 is identical to the plug circuitry 52 of the second plug 18.

In one embodiment, in the situation shown in FIG. 2, the detection that no cord is inserted into a port of either intelligent patch panel is determined by reading the digital input/output gate 48 or 49 in the intelligent patch panel circuitry when control w=on, control x=off, and control z=on. If the reading at the digital input/output gate is logically high and there is no communication between panels via the digital input/output gates 48 and 49, then it is determined that there is no patch cord inserted into either patch panel port. If the reading at the digital input/output gate 48 is logically low, or if there is communication between the digital input/output gates 48 and 49, then the system determines that a cord has been inserted and the type of cord must next be determined.

Figure 3:
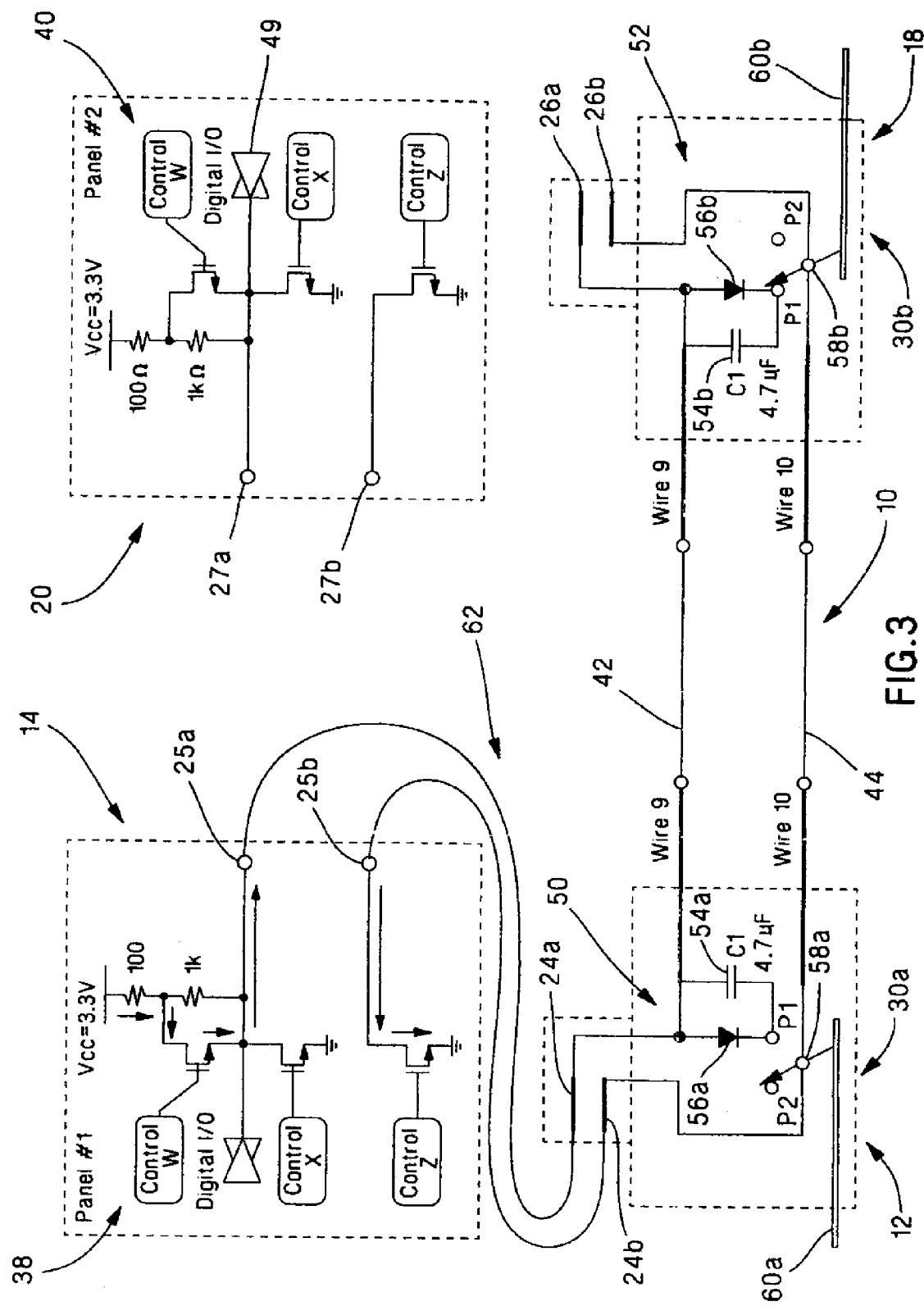
FIG. 3 is a schematic diagram of circuitry within intelligent patch panels and a ten-wire patch cord illustrating operation when one plug of the patch cord is plugged into an intelligent patch panel port.

FIG. 3 shows electrical connections in the condition when the first plug 12 is plugged into the first intelligent patch panel port 14, but the second plug 18 is not plugged into any patch panel port. For illustration purposes the plug 12 is not shown physically plugged into the port 14, but the electrical connections between, respectively, contacts 25a and 24a, and 25b and 24b, are shown by lines 62. In the plug 12 that has been plugged into the port 14, the plunger 60 has been depressed, so that the switch 58a has effectively removed the light emitting diode 56a from the resulting electrical circuit. In the second, unplugged plug 18, plunger 60b remains in its extended state. Thus, the switch 58b allows the light emitting diode 56b to remain in the circuit such that it can be illuminated when current flows through the ninth and tenth wires 42 and 44.

With control w=on, control x=off, and control z=on at the first port 14, current flows in the control and detection circuitry 38 as indicated by arrowed lines in FIG. 3. The presence of the patch cord can be detected by reading the characteristic capacitance resulting from the capacitor 54b. The LED 56b is illuminated by turning controls w and z on, allowing the "loose end" of the patch cord to be illuminated and indicated to a technician during an installation operation.

Figure 4:
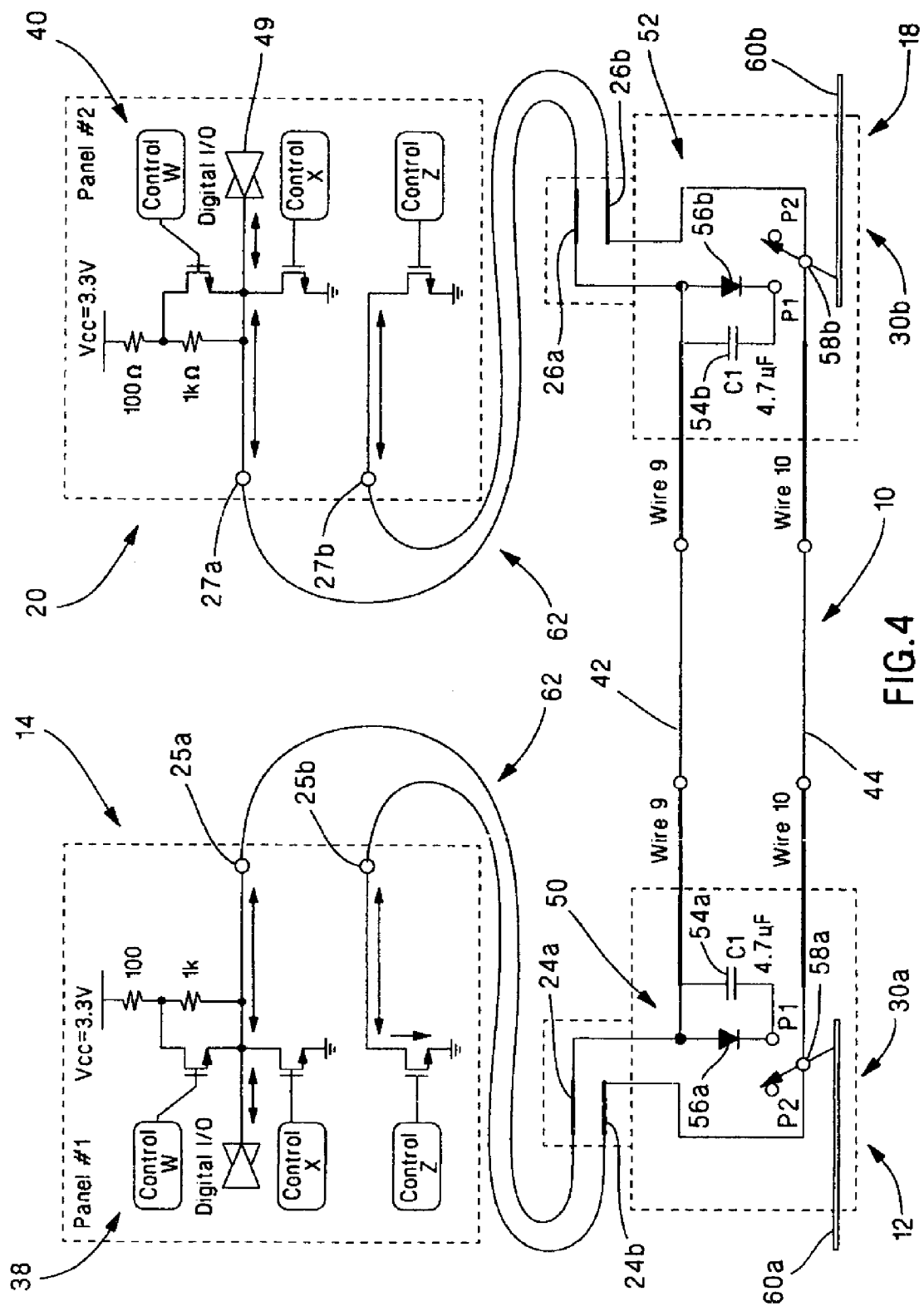
FIG. 4 is a schematic diagram of circuitry within intelligent patch panels and a ten-wire patch cord illustrating operation when both plugs of the patch cord are plugged into intelligent patch panel ports.

FIG. 4 shows electrical connections in the condition when the first plug 12 is plugged into the first intelligent patch panel port 14, and the second plug 18 is plugged into the second intelligent patch panel port 20. Again, the plugs 12 and 18 are not shown physically plugged into the ports 14 and 20, and lines 62 indicate the electrical connections between the ninth and tenth contacts of the intelligent patch panel ports 14 and 20 and their respective ninth and tenth contacts on the patch cord 10. In this condition, both plungers 60a and 60b have been depressed upon insertion of the respective plugs 12 and 18 into the ports 14 and 20. Thus, both LED's 56a and 56b have been effectively removed from the resulting electrical circuit. In this state, the LED's 56a and 56b cannot be illuminated by current flowing in the ninth and tenth wires 42 and 44, and the ninth and tenth wires 42 and 44 can therefore be used to carry signals between the first and second ports 14 and 20 without interference from the LED's 56a and 56b. We note that while wires 42 and 44 are referred to as "ninth and tenth" wires, they may be considered first and second patch cord management conductors. The insertion states of both plugs 12 and 18 into their respective ports 14 and 20 can be detected by the ability of ports 14 and 20 to communicate with one another, for example via the digital input/output gates 48 and 49. Arrows are shown within the control and detection circuits 38 and 40 to indicate signal pathways between the ports 14 and 20 when the patch cord 10 connects the ports.

Intelligent patch panel systems according to the present invention are preferably provided with circuitry and logic to enable a number of functions in cooperation with a ten-wire cross-connect patch cord, including guiding additions and removals of patch cords in a cross-connect deployment.

The system can also visibly identify, in a visible patch cord trace operation, the patch cord end points of a particular patch cord connected between two intelligent patch panel ports by illuminating LED's provided next to the intelligent patch panel ports. Detection of patch cord connections as described above allows the monitoring and reporting of unauthorized patch cord removals or insertions at patch panel ports.

With reference to FIG. 1, an example patch cord addition process according to one embodiment of the present invention begins when the intelligent patch panel ports 14 and 20 have respective port LED's 64 and 66 illuminated to guide a technician to the correct ports to plug the patch cord plugs into. The first plug of the patch cord 10 is next plugged into one of the ports, and the LED provided within the corresponding plug is switched out of the signal path. For example, with reference to FIG. 1, if the first plug 12 is inserted into the first port 14, the LED 56a corresponding to the first plug 12 is removed from the signal path comprising the ninth and tenth wires of the patch cord 10 at this step. Next, the LED 56b associated with the unplugged plug 18 is illuminated, indicating to the technician the correct plug to be plugged into the second port 20 (whose LED 66 will still be illuminated) guiding the technician to the port. Once the system has verified that the correct ports have been connected, the LED's 64 and 66 associated with the ports 14 and 20 are turned off, and the LED's 56a and 56b remain out of the signal pathway between the two ports.

A patch cord trace function is also enabled when only one plug is plugged into a port. In this trace function, the port LED associated with the port is illuminated, and so is the LED provided in the unplugged plug of the patch cord. This is of particular benefit when there are several patch cords in a patch field, and determining which patch cord plug is correct could otherwise involve a time-consuming manual tracing of the patch cord from a patch panel port to the correct plug at the unplugged end of the patch cord.

While the terms "ninth" and "tenth" have been applied herein to contacts, conductors, and the like, this is done in the exemplary context of use with a four-pair Ethernet cable. From the standpoint of the management functions of this invention, they may be considered first and second elements.

While particular embodiments of the present invention have been showed and described, it will be obvious to those skilled in the art that changes and modifications may be made without departing from the general scope of this disclosure. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A system for guiding patch cord insertions and removals comprising:
   a patch cord having a first plug and a second plug, said patch cord comprising first and second patch cord management conductors, said first plug having first and second plug contacts making electrical contact, respectively, with said first and second patch cord management conductors, and said second plug having first and second plug contacts making electrical contact, respectively, with said first and second patch cord management conductors; said first and second patch cord management conductors comprising a portion of an electrical circuit, at least one of said first and second plugs comprising a capacitor and a light-emitting diode placed in parallel, and a plunger switch that can selectively insert or remove said capacitor and said light-emitting diode from said electrical circuit, wherein when said plunger switch is activated, said capacitor and said light-emitting diode are removed from said electrical circuit, and when said plunger switch is deactivated, said capacitor and said light-emitting diode are within said electrical circuit;
   a first intelligent patch panel comprising a plurality of ports, each of said ports comprising first and second panel contacts, said first and second panel contacts being adapted to make contact with first and second plug contacts of said plugs when said plugs are plugged into said ports, said first intelligent patch panel further comprising a first control and detection circuit;
   a second intelligent patch panel comprising a plurality of ports, each of said ports comprising first and second panel contacts, said first and second panel contacts being adapted to make contact with first and second plug contacts of said plugs when said plugs are plugged into said ports, said second intelligent patch panel further comprising a second control and detection circuit;
   wherein said first and second control and detection circuits comprise control circuits and digital input/output gates, and detection of insertion of patch cords into the ports of the first and second intelligent patch panels is accomplished by reading the status of the digital input/output gates when the control circuits are placed in predefined states.

2. The system of claim 1 wherein the presence or absence of a plug in said ports of said intelligent patch panel is detected by reading the characteristic capacitance resulting from the capacitor.

\* \* \* \* \*